Nov. 11, 1952 — H. H. OLIVER — 2,617,317
CIRCULAR SAW JOINTER
Filed Jan. 24, 1951

Henry H. Oliver
INVENTOR.

Patented Nov. 11, 1952

2,617,317

UNITED STATES PATENT OFFICE 2,617,317

CIRCULAR SAW JOINTER

Henry H. Oliver, Antlers, Okla., assignor of fifty per cent to I. T. House, East Peoria, Ill.

Application January 24, 1951, Serial No. 207,614

1 Claim. (Cl. 76—48)

This invention relates to saw jointers and sharpeners, and more particularly to a saw jointer for use in dressing the teeth of a circular saw.

It is an object of the invention to provide a saw jointer that can be installed on various types of circular saw bases and operated to dress the saw teeth to the same length regardless of the size of the saw.

Still another object is to provide a portable saw jointer which can be taken from place to place and suitably positioned on the saw supporting base and operated to perform the dressing or jointing of the teeth while the saw is rotated and without removing the saw blade.

Various other objects and advantages will be apparent as the invention is described in more detail.

Although the novel features, which are believed to be characteristic of my invention, will be pointed out more particularly in the claim appended hereto, the invention itself, as to its objects and advantages and manner in which it may be carried out, may be better understood by referring to the following description taken in connection with the accompanying drawings in which a specific embodiment thereof has been set forth for purposes of illustration.

Figure 1:
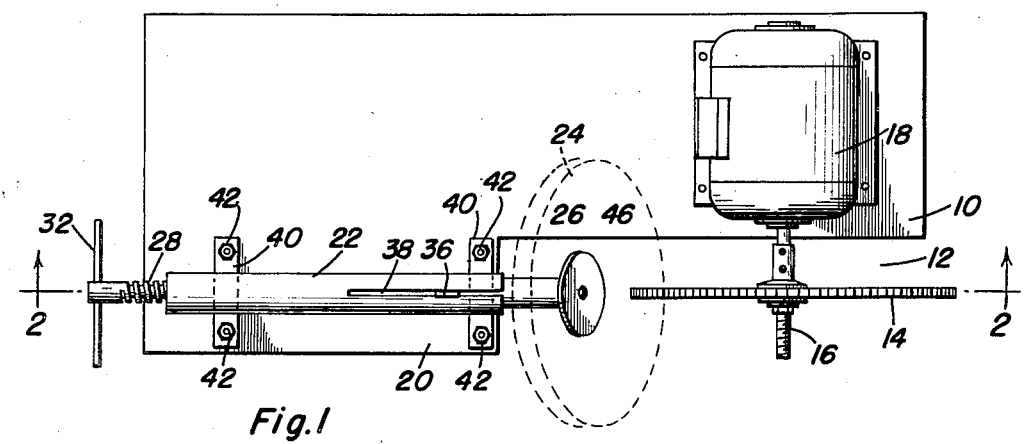
Figure 1 is a plan view of a saw jointer embodying the novel features of the present invention, the abrading element being illustrated in dotted lines on the drawing.

Referring now more particularly to the drawings in detail, wherein like reference characters indicate like parts throughout the several views, the numeral 10 refers to a base or bed plate which may be made of wood or metal. The base is provided with a cut-away open section 12 adapted for receiving a circular saw blade 15, and which is suitably mounted on the outer end of a drive shaft 16 of a motor 18, the latter being mounted on the base 10 adjacent to the opening 12.

Attached to the base section 20 and forward of the open section 12 is an elongated tubular holder 22 for adjustably positioning an abrading or grinding tool 24. The tubular member 22 comprises an inner telescoping tubular section 26 which is adapted to be adjustably extended and retracted from the tube 22 by means of a screw 28 which is threaded into the outer end of the tube 22 as at 30. A handle 32, which is in the form of a cross bar is positioned on the outer end of the screw 28 and serves to facilitate operation of the same. The inner end of the screw 28 is rotatably secured to the end of the tube 26, as at 34. To prevent rotation of the tube 26 relative to the tube 22, a lug or key 36 is welded or otherwise formed on the tube 26 and is arranged to be guided in a longitudinal slot 38 formed in the top side wall of the tube 22. For securing the tube 22 and its assembled parts onto the base portion 20, suitable bracket members 40 are utilized which are welded or otherwise secured to the underside of the tube, the brackets in turn, being bolted or otherwise attached to the base 10, as at 42.

Suitably secured, as by welding, to the outer end of the slidable tube member 26 is a triangular shaped bracket 44 on which is mounted a circular plate or disc 46 for receiving and supporting the circular abrading wheel 24 which is suitably secured to the plate 46, as by means of a bolt 50, which is positioned in the aperture 48, the abrading wheel being fastened thereon by means of a nut 52.

Figure 2:
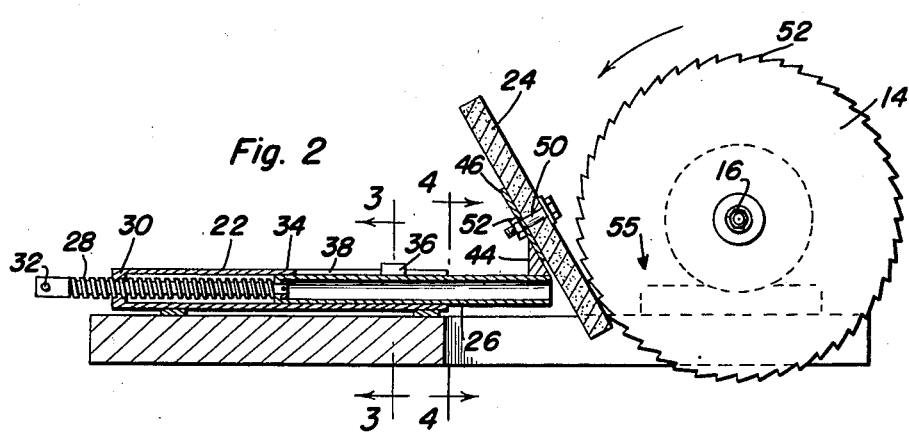
Figure 2 is an elevational view of the embodiment shown in Figure 1, the device parts being shown in section and taken substantially on the line 2—2 of Figure 1 and looking in the direction of the arrows.
Figure 3:
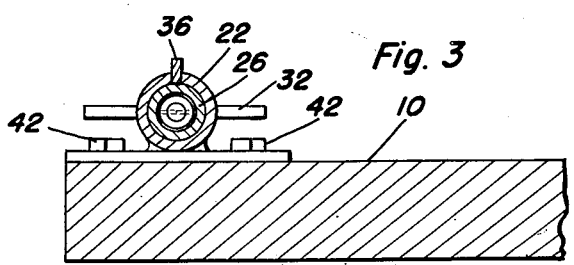
Figure 3 is a fragmentary sectional view taken on the line 3—3 of Figure 2 and looking in the direction of the arrows.
Figure 4:
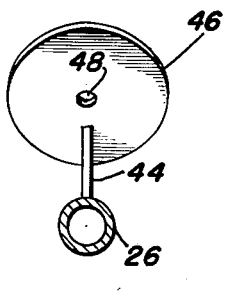
Figure 4 is a view in section taken on the line 4—4 of Figure 2 and looking in the direction of the arrows, and wherein the abrading stone is shown removed from the holder.

For the purpose of dressing or jointing the teeth 52 on a circular saw blade 14, the bracket 44 and attached disc member 46, upon which the abrading stone, such as an emery stone 24, is positioned, the parts are arranged on the end of the extensible tubular member 26 so that the surface of the abrading stone 24 will contact the teeth at substantially right angles thereto as indicated by the line 55 in Figure 2, the abrading tool 24 being thereby arranged substantially tangential to the saw blade 14. The saw blade 14 during dressing of the same is rotated counter-clockwise, as shown by the arrow in Figure 2. In this manner the teeth can be dressed and rendered even in a very short time by rotation of the saw blade in contact with the abrading stone 24.

In the operation of the device to sharpen and even up the saw teeth 52, the saw blade is mounted on the motor shaft 16 and while rotating the same, the screw 32 is operated to move the whetstone 24 squarely thereagainst.

The supporting base 10 may be suitably bolted or otherwise positioned, as by the use of conventional C-shaped clamps, to a workbench, saw horse or other supporting means during use of the jointer, or where the saw blade is to be dressed on the job, the tool holder and adjusting member 22 may be suitably detached from the base and transported to the saw blade and there suitably positioned adjacent to the saw and operated to dress the teeth. Further, when desired, the angular position of the abrading tool 24 relative to the base may be changed where it is desired to put a slight bevel on the teeth rather than a square even edge.

While in the foregoing description there has been shown and described the preferred embodiment of this invention, it will be understood, of course, that minor changes in the details of construction, and substitutions may be made in the combination and arrangement of the parts without departing from the spirit and scope of the invention as claimed.

Having described the invention, what is claimed as new is:

In a saw jointer, a base, a motor mounted on said base and including an armature shaft, a circular saw on said shaft, a slide mounted on said base in the plane of said saw for movement toward and from said saw with one end facing the periphery of the saw, and a grinding disk on said end of the slide movable by said slide toward and from the periphery of the saw into and from engagement with the teeth of the saw, said disk being disposed in a fixed plane at a right angle to the plane of the saw and tangentially of the periphery of the saw to engage a portion of said disk below its axis with the teeth of the saw.

HENRY H. OLIVER.

REFERENCES CITED

The following references are of record in the file of this patent:

UNITED STATES PATENTS

| Number | Name | Date |
|---|---|---|
| 343,203 | Shives | June 8, 1886 |
| 382,327 | Robinson | May 8, 1888 |
| 422,323 | Strouse | Feb. 25, 1890 |
| 769,008 | McMaster | Aug. 30, 1904 |
| 771,211 | Schroeder | Sept. 27, 1904 |
| 1,168,379 | deGroot | Jan. 18, 1916 |
| 1,567,688 | VanDamme | Dec. 29, 1925 |
| 1,771,602 | Armstrong et al. | July 29, 1930 |
| 1,866,101 | Hach et al. | July 5, 1932 |
| 1,884,924 | VanBerkel | Oct. 25, 1932 |
| 1,933,184 | Rodmore | Oct. 31, 1933 |